United States Patent
Dahan et al.

(10) Patent No.: US 8,458,429 B2
(45) Date of Patent: Jun. 4, 2013

(54) MEMORY CONTROLLER IDLE MODE

(75) Inventors: Franck Dahan, Nice (FR); Gilles Dubost, Valbonne (FR); Sylvain Dubois, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 665 days.

(21) Appl. No.: 11/948,844

(22) Filed: Nov. 30, 2007

(65) Prior Publication Data

US 2008/0162980 A1 Jul. 3, 2008

Related U.S. Application Data

(60) Provisional application No. 60/883,032, filed on Dec. 31, 2006.

(51) Int. Cl.
| | |
|---|---|
| *G06F 12/00* | (2006.01) |
| *G06F 13/00* | (2006.01) |
| *G06F 13/28* | (2006.01) |
| *G06F 1/00* | (2006.01) |
| *G06F 1/26* | (2006.01) |
| *G06F 1/32* | (2006.01) |
| *G06F 11/30* | (2006.01) |
| *G06F 1/04* | (2006.01) |
| *G06F 1/12* | (2006.01) |
| *G06F 5/06* | (2006.01) |

(52) U.S. Cl.
USPC ............ 711/170; 711/104; 711/167; 710/25; 713/300; 713/320; 713/322; 713/340; 713/601

(58) Field of Classification Search
None
See application file for complete search history.

(56) References Cited

U.S. PATENT DOCUMENTS

| 5,493,684 | A | 2/1996 | Gephardt et al. |
| 5,642,489 | A | 6/1997 | Bland et al. |
| 5,661,751 | A | 8/1997 | Johnson |
| 6,088,806 | A * | 7/2000 | Chee .............................. 713/322 |
| RE38,108 | E | 5/2003 | Chee et al. |
| 6,781,911 | B2 * | 8/2004 | Riesenman et al. .......... 365/226 |
| 6,820,209 | B1 * | 11/2004 | Culbert et al. ................. 713/501 |
| 6,894,691 | B2 * | 5/2005 | Juenger ......................... 345/531 |
| 7,587,525 | B2 | 9/2009 | Dahan et al. |

(Continued)

OTHER PUBLICATIONS

Mobile Computer Display Controller, Lynx3DM+Databook, May 21, 2002, pp. 1-349, Preliminary Version 0.8, Silicon Motion, Inc., U.S.A.

(Continued)

*Primary Examiner* — Michael Alsip
(74) *Attorney, Agent, or Firm* — Ronald O. Neerings; Wade James Brady, III; Frederick J. Telecky, Jr.

(57) ABSTRACT

An apparatus and method for dynamically modifying one or more operating conditions of a memory controller in an electronic device. Operating conditions may comprise clock frequency and power, which may be modified or removed. Dynamic modification of operating conditions may be done for purposes of optimizing a parameter, such as power consumption. A mode, referred to as idle mode, may be used as a transitional or operational mode for the memory controller. The performance of the memory controller may dynamically vary in response to changes in its operating conditions. As such, the memory controller may comprise multiple modes, or submodes, of operation. The performance of the memory controller may depend on the type of memory it controls, for instance Double Data Rate (DDR) Dynamic Random Access Memory (DRAM).

15 Claims, 5 Drawing Sheets

U.S. PATENT DOCUMENTS

| | | |
|---|---|---|
| 7,809,961 B2 | 10/2010 | Dahan et al. |
| 7,840,827 B2 | 11/2010 | Dahan et al. |
| 2003/0115491 A1* | 6/2003 | Williams et al. .............. 713/300 |
| 2004/0139359 A1* | 7/2004 | Samson et al. ................ 713/320 |
| 2005/0057954 A1* | 3/2005 | Sultenfuss et al. ............ 365/145 |

OTHER PUBLICATIONS

Chris Wellheuser, Metastability performance of Clocked FIFOs, 1996, pp. 1-12, Texas Instruments, U.S.A.

* cited by examiner

MEMORY CONTROLLER IDLE MODE

CROSS REFERENCE TO RELATED APPLICATIONS

This application claims priority under 35 USC §119(e)(1) of Provisional Application No. 60/883,032, filed Dec. 31, 2006, incorporated herein by reference.

FIELD OF THE INVENTION

The present invention generally relates to dynamic operating conditions in an electronic device. More particularly, the invention relates to a transitional mode or operational mode for dynamic transitions in the functioning of the electronic device.

BACKGROUND OF THE INVENTION

Dynamic operating conditions are commonly used to improve performance of electronic devices, including their power consumption. Reducing power consumption in electronic devices is desirable for many reasons. Reducing consumption of power lowers the heat generated by the device, thereby increasing the reliability and decreasing the operating cost of the device. In addition, reducing the consumption of power allows battery-powered portable electronic devices, such as cellular telephones, portable music players, laptop computers, and portable gaming devices, to operate for long periods without charging the batteries.

Various techniques have been devised for reducing power consumption of electronic devices. These techniques include making the chip smaller in size using Ultra Large Scale Integration (ULSI) or Very Large Scale Integration (VLSI) techniques. Power management units may also be used to reduce the power consumption. One power reduction technique includes the capability of stopping clock signals that drive circuits which are inactive in the chip for a period of time. A device employing such a technique includes a power management unit (PMU) that detects or predicts inactive circuits and accordingly stops clock signals associated with the inactive circuits. By turning off clock signals that drive inactive circuits, the power consumption of the electronic device decreases. Additionally, removing power from inactive circuits may reduce leakage currents within the circuits. Other techniques include reducing the frequency of clock signals that drive circuits during modes of operation that are not time critical and removing power from inactive circuits.

Some memories and memory controllers may not support dynamic changes in their operation to reduce power consumption using the techniques described above. As one example, memory controllers for Double Data Rate (DDR) Dynamic Random Access Memory (DRAM) may have a delay locked loop (DLL) component that locks onto the frequency of a clock signal. If the clock is gated or the frequency is changed, the DLL may unlock, causing corruption of data during a subsequent access of memory. In order to avoid data corruption because of dynamic operating conditions, access may have to be denied for some period of time. With regard to changing the operating frequency of a memory controller for DDR DRAM, the period of time corresponds to the time required for the DLL to relock to the modified frequency.

Further complications to dynamic operating conditions are introduced by complex integrated circuitry. For example, a system-on-a-chip (SOC) may comprise multiple components that access memory, e.g., processor(s), DMA devices, camera interface, display interface, hardware accelerator, and so on. The latency and difficulty required to prevent all components from accessing the memory controller for each operating condition change may degrade performance, increase software complexity and result in inefficient, operation. DMA channels may have to be stopped and restarted, processors may be idled and latency introduced by pausing to complete pending transactions. Furthermore, SOC systems including multiprocessors may require additional software synchronization. Finally, accesses to memory components such as hardware accelerators, camera interfaces, and display interfaces on the SOC may be difficult to stop. Waiting until each component completes processing increases latency. This may greatly limit dynamically changing operating conditions to reduce power consumption.

SUMMARY OF THE INVENTION

An apparatus and method for dynamically modifying one or more operating conditions of a memory controller and/or the memory it controls in an electronic device are disclosed. Operating conditions may comprise clock frequency and power, which may be modified or removed. Dynamic modification of operating conditions may be done for purposes of optimizing a parameter, such as power consumption. A mode, referred to as idle mode, may be used as a transitional or operational mode for the memory controller. The performance of the memory controller may dynamically vary in response to changes in its operating conditions. As such, the memory controller may comprise multiple modes, or sub-modes, of operation. The performance of the memory controller may depend on the type of memory it controls, for instance DDR DRAM.

In some embodiments, a method for dynamically modifying an operating condition of a memory controller comprises: indicating that an operating condition of the memory controller may be modified; preparing the memory controller, and the memory it controls, for modification of an operating condition; denying at least some access to the memory controller while the operating condition is being modified; and reinstating access to the memory controller under the modified operating condition.

In some embodiments, an electronic device comprises: circuitry capable of dynamically varying an operating condition of a memory controller; and a memory controller capable of dynamically varying its response to the dynamically varied operating condition.

NOTATION AND NOMENCLATURE

Figure 1:
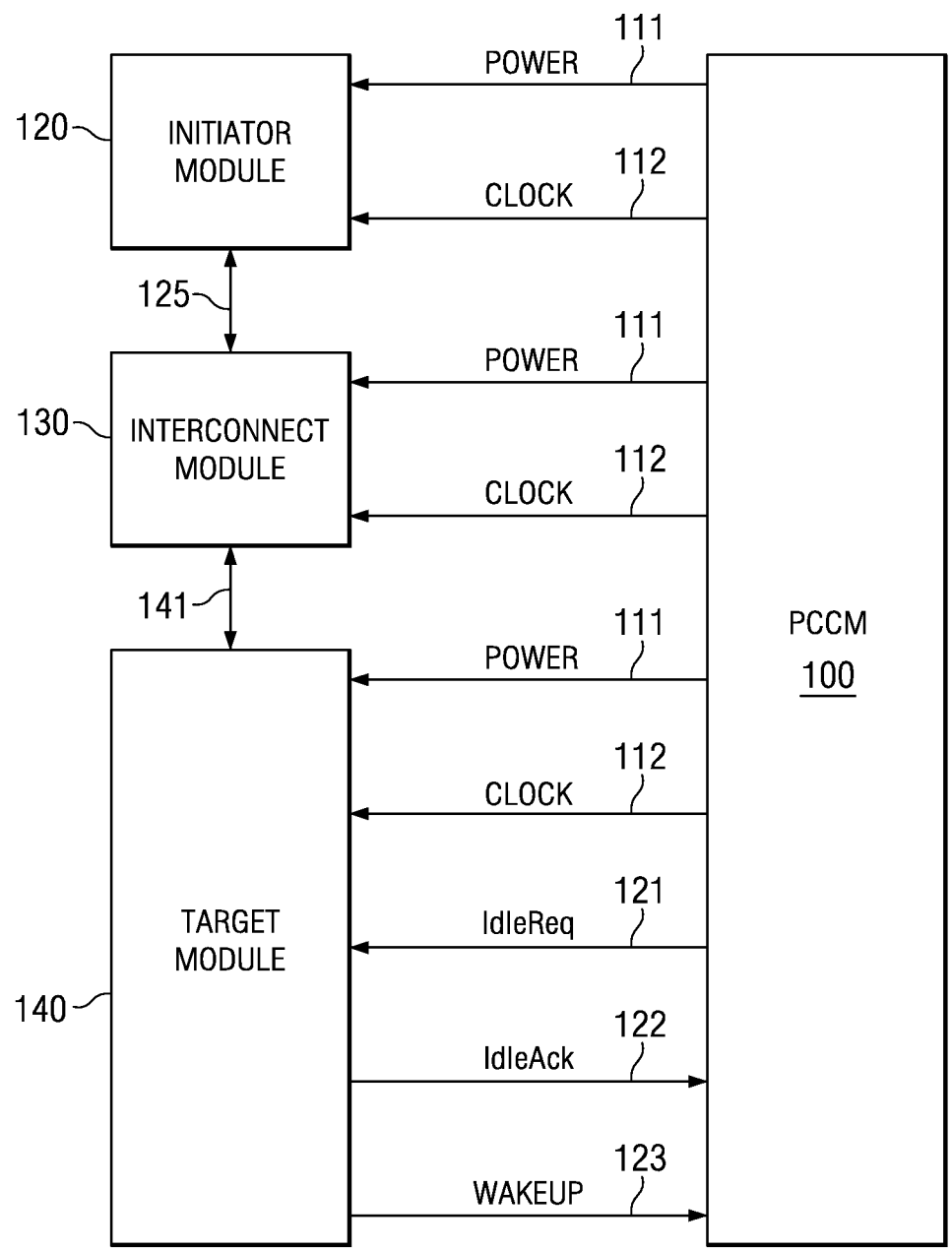
FIG. 1, in accordance with some embodiments of the invention, shows a power and clock control module (PCCM) coupled to an initiator module, an interconnect module, and a target module.

Certain terms are used throughout the following description and claims to refer to particular system components and configurations. As one skilled in the art will appreciate, companies may refer to a component by different names. Likewise, with respect to the name of the mode, e.g., idle mode, names of submodes, and other nomenclature, naming serves to simplify discussion. This document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct electrical connection. Thus, if a first device couples to a second device, that connection may be through a direct electrical connection or though an indirect electrical connection via other devices and connections. Furthermore, the term "information" is intended to refer to any data, instructions, or control sequences that may be communicated between components of a device. For example, if information is sent between two components, data, instructions, control sequences, or any combination thereof may be sent between the two components.

DETAILED DESCRIPTION OF THE EMBODIMENTS

In accordance with some embodiments of the invention, in an electronic device, a power and clock control module (PCCM) couples to an initiator module, interconnect module, and target module. An initiator module is any logic circuitry that may generate write requests or read requests. Thus, the initiator module may be a processor, graphics accelerator, display controller, audio interface, digital signal processor, microcontroller unit (MCU), direct memory access (DMA) device, video accelerator, universal serial bus (USB) device, or a peripheral device that is capable of initiating read or write requests, and so on. An interconnect module may be any logic circuitry capable of routing information from an initiator module to a target module. Examples of interconnect modules are a bus, an interconnection network, and so on. A target module is any logic circuitry that is the destination of a write request or a read request. Examples of target modules include memory devices such as a cache, register, static random access memory (SRAM) controller, dynamic random access memory (DRAM) controller, and so on. Another example of a target module is a peripheral device, such as a display device, UART, and so on.

Logic circuitry may be both an initiator module and a target module. Thus, for example, a direct memory access (DMA) controller may be an initiator module when it is generating write requests or read requests. When the DMA controller is the destination of a write request or a read request from, for example, a processor, the DMA controller may be a target module.

In order to optimize one or more operational parameters, e.g., to conserve power, it is desirable to dynamically modify operating conditions of one or more components in an electronic device. For example, when an initiator module enters a power saving mode and no longer initiates read and write requests to a target module, the target module may enter a power saving mode, referred to herein as an idle mode, to reduce the consumption of power. Idle mode referenced above is described in detail in the copending, commonly assigned patent application "Idle Mode for Power Management" by Dahan, et al., Ser. No. 11/559,387, filed Nov. 13, 2006.

Communication between various components about dynamic changes in operating conditions, e.g., to conserve power, may be implemented in a variety of ways. In some embodiments of the invention, one or more dedicated hardware signals may communicate and control transition into and out of an idle mode. For example, in some embodiments of the invention, a component such as the PCCM, using an idle request signal, i.e., idlereq, communicates an impending change in operating conditions and, therefore, a necessary transition to idle mode in the target module, to which the target module responds with an idle acknowledge signal, i.e., idleack, and a wakeup signal.

In other embodiments of the invention, communication between various components about dynamic changes in operating conditions, may be implemented, for example, by one or more commands in the bus protocol, to which some or all components coupled to the bus are designed to be responsive. In still other embodiments of the invention, communication between various components about dynamic changes in operating conditions, may be implemented, for example, by one or more configuration bits in components subject to dynamic changes in operating conditions.

In still other embodiments of the invention, communication about modes, and even submodes, of operation, or lack thereof, may be implemented by a combination of the foregoing and/or other communication protocols. For example, in some embodiments of the invention, a mode of operation may be communicated by dedicated hardware signals while a submode of operation may be set by configuration bit(s) in a target module. While there are numerous embodiments of communication between various components about dynamic changes in operating conditions, further discussion of embodiments herein are directed at communication by way of dedicated hardware signals. The following embodiments are exemplary without limitation as to implementations of the inventions described herein.

Referring to FIG. 1, a PCCM 100 couples to an initiator module 120, interconnect module 130, and target module 140. PCCM 100 provides power and a clock signal to each module through power line 111 and clock line 112. Power line 111 provides power to logic circuits in each module, and clock line 112 provides a clock signal to logic circuits in each module for control and synchronization. In some embodiments of the invention, clock line 112 may provide identical clock signals to each module, derived clock signals to each module, or independent clock signals to each module from PCCM 100. In some embodiments of the invention, PCCM 100 may provide varying amounts of power to each module through power line 111.

In the electronic device shown in FIG. 1, interconnect module 130 couples to both initiator module 120 and target module 140. Interconnect module 130 may be any logic circuitry capable of routing information, such as data and instructions, from initiator module 120 to target module 140. Further, interconnect module 130 may communicate events, such as interrupts or direct memory access (DMA) requests, between target module 140 and initiator module 120. An interrupt is a signal that momentarily interrupts initiator module 120 processing and indicates to initiator module 120 that a predefined event has occurred within target module 140. A DMA request is a request for information between modules. Interconnect module 130 may consist of a bus, which may be described as a set of conductors coupled between modules of the electronic device. In some embodiments of the invention, events may be communicated between target module 140 and initiator module 120 through separate connections between the modules (not shown in FIG. 1).

Interconnect module 130 may be an interconnection network which is a collection of buses connected together to form a mesh with nodes at the bus intersections, the buses including logic circuitry for routing information from one module at a node to another module at another node. Further, interconnect module 130 may be any other device capable of routing information between modules.

Initiator module 120 is any logic circuitry within an electronic device that generates write or read requests. For example, initiator module 120 may be a processor, graphics accelerator, display controller, audio interface, digital signal processor, microcontroller unit (MCU), direct memory access (DMA) device, video accelerator, universal serial bus (USB) device, any other type of device capable of executing write or read instructions, and so on. Initiator module 120 connects to interconnect module 130 through connection 125.

Target module 140 is any logic circuitry within a device that is the destination of a write or read request in the device. For example, target module 140 may be a memory device, such as a register, cache, internal or external SRAM or DRAM controller, or a peripheral device, such as a display device, UART, and so on. Interconnect module 130 connects to target module 140 through connection 141.

Initiator module 120, for example, may be a processor capable of reading information from target module 140, which may be a memory device, such as a DDR synchronous DRAM (SDRAM) controller. When the processor generates a request to the memory device, interconnect module 130 coordinates the request to the memory device. Interconnect module 130 then coordinates the transmission of information obtained from the memory device to the processor. In some embodiments of the invention, multiple initiator modules 120 and target modules 140 may be present and interconnect module 130 may serve to coordinate the flow of information between the modules. In some embodiments of the invention, interconnect module 130 may comprise a plurality of components, e.g., a plurality of buses or a bus, or buses, and other components.

Modules in an electronic device may include circuitry that are not contiguously placed next to each other but rather distributed throughout the device, perhaps with intervening modules. Thus, the modules shown in FIG. 1 may be considered a logical partitioning of the circuits on an electronic device rather than a physical partitioning. For example, consider a chip containing the circuitry for a processor and a cache. The processor circuitry may be located on different portions of the chip and contiguous to or mixed in with the cache circuitry. Circuitry for the processor may be logically grouped into an initiator module and the circuitry for the cache may be logically grouped into a target module. Similarly, the chip may contain bus circuitry that is distributed among different portions of the chip although it connects the processor circuitry and cache circuitry. The bus circuitry and any intervening modules may be logically grouped into an interconnect module.

When initiator module 120 does not initiate read or write requests to target module 140, PCCM 100, e.g., for purposes of power optimization, may dynamically modify the power and clock signal provided to initiator module 120 to reduce the power consumed by the logic circuitry in initiator module 120. Thus, initiator module 120 may enter a standby mode in which it consumes less power, in which case it may not use the clock signal. Initiator module 120 may exit standby mode if a read or write request needs to be initiated to other components of the device. To exit standby mode, initiator module 120 informs PCCM 100 to activate the power and the clock signal. Standby mode referenced above is described in detail in the copending, commonly assigned patent application "Standby Mode for Power Management" by Dahan, et al., Ser. No. 11/559,388, filed Nov. 13, 2006.

When initiator module 120 enters standby mode, PCCM 100 may modify, e.g., deactivate or change, the power and/or clock signal transmitted to target module 140, e.g., to reduce the power consumed by the logic circuitry in target module 140. Thus, the target module may enter an idle mode in which it consumes less power and may not use the clock and power signals. Target module 120 may exit idle mode if initiator module 120 exits standby mode or target module 140 needs to send an interrupt to initiator module 120.

Target module 140 entering idle mode may cause interconnect module 130 to also enter a power saving mode if interconnect module 130 does not have information to transmit or, in other embodiments, during transition of dynamically modified operating conditions. In some embodiments of the invention, target module 140 may enter idle mode after interconnect module 130 enters the power saving mode. Placing target module 140 in idle mode and interconnect module 130 in power saving mode may reduce power consumption within the device. In some embodiments of the invention, interconnect module 130 may be capable of entering idle mode.

While the amount of power saved each time a target module 140 is in idle mode may not be significant, the cumulative effect of power saved by placing target module 140 in idle mode may be considerable. Because multiple initiator modules 120, interconnect modules 130, and target modules 140 may be present in the device, standby mode in the initiator module, idle mode in the target module, and power saving mode in the interconnect module may save significant amounts of power. Thus, electronic devices utilizing standby mode, idle mode, and power saving mode allow battery powered devices, such as laptop computers, portable music players, cellular telephones, personal digital assistants (PDA), and other portable electronic devices, to reduce power consumption and increase battery life.

In some embodiments of the invention, idle mode is used to transition the operating conditions of target module 140 for optimizing electronic device parameter(s). Thus, in some embodiments of the invention, idle mode may be used to stall access(es) by one or more initiator modules 120 to target module 140, such as a memory controller, during a transition of operating conditions when the target module 140 is unable to properly respond to requests. Idle mode may be used as a temporary state of transition between dynamically altered operating conditions, or in any case where stalling access to target module 140 is necessary. Idle mode may be used as a lingering state of modified operation in which target module 140 may dwell for an extended period of time. Depending on how communication and control of idle mode is implemented, whether or not idle mode is used in a particular instance as a sustained state or a temporary transition state may be implemented as submodes within the idle mode. Alternatively, additional, separate modes in addition to idle mode may differentiate and implement various states of operation, or lack thereof. Where control of idle state lies entirely outside target module 140, varieties of idle state may be transparent to target module 140.

In some embodiments of the invention, as described above, target module 140 may detect when initiator module 120 enters standby mode. As shown in FIG. 1, in some embodiments of the invention, PCCM 100 activates an idlereq signal to target module 140 through an idlereq line 121 when initiator module 120 enters standby mode and interconnect module 130 is not transferring information to target module 140. Target module 140 may be in an inactive state when not communicating with initiator module 120 or interconnect module 130. If target module 140 is inactive, an idleack signal is activated to PCCM 100 through an idleack line 122. In some embodiments, once the idleack signal is activated, target module 140 no longer transmits events to initiator module 120. Events may be interrupts, DMA requests, or other events synchronous to a commonly used clock signal in the device, such as a clock signal to interconnect module 150.

When PCCM 100 receives the idleack signal, PCCM 100 may reduce or eliminate power sent to target module 140 and/or modify, including stop, the clock signal transmitted to target module 140. In some embodiments of the invention, PCCM 100 may remove the clock signal used for communications between target module 140 and interconnect module 130. In some other embodiments of the invention, PCCM 100 may modify the frequency of the clock signal. In embodiments where the clock frequency is reduced, target module 140 may use the clock signal to continue operating while reducing power consumption.

In some embodiments of the invention, while target module 140 is in idle mode it may not communicate with any modules in the device other than PCCM 100. In some embodiments of the invention, target module 140 may communicate with modules while in idle mode. In some other embodiments of the invention, target module 140 may have limited communication with modules in the device while in idle mode.

In embodiments where target module 140 is not allowed to communicate with other modules and needs to do so, target module 140 must exit idle mode before any communication may occur. If a condition occurs that causes target module 140 to wakeup from idle mode, as described below, target module 140 may activate a wakeup signal to PCCM 100 through a wakeup line 123. After PCCM 100 receives the wakeup signal, PCCM 100 returns the power and clock signals to previous, e.g., normal, operating conditions. PCCM 100 then deactivates the idlereq signal and target module 140 deactivates the wakeup and idleack signals and exits idle mode. Target module 140 may also wakeup from idle mode if initiator module 120 exits standby mode or PCCM otherwise deactivates the idlereq signal. In either instance, PCCM 100 deactivates the idlereq signal and returns the power and clock signals to non-idle mode operating conditions depending on the state of operation upon exiting idle mode. Target module 140 may then receive and process requests from initiator module 120.

In accordance with some embodiments of the invention as described above, target modules may dwell in an idle state for modified operation or no operation. Such functionality may be implemented in one or more modes and/or submodes. As previously discussed, the idle state may be used to optimize one or more parameters, such as power consumption. Power consumption may be reduced while allowing error free operation of the electronic device. Verification and validation of the electronic device shown in FIG. 1 may be performed by testing a target module to ensure the idlereq, idleack, and wakeup signals function properly. Logical partitioning of the circuitry, as described above, into modules allows simplified verification and testing. Thus, costly and time consuming testing of the device at the chip or system level for the power management system may not be necessary.

In accordance with some embodiments of the invention as described above, target modules may temporarily transition into an idle state to stall operation pending dynamic modification of operating parameters. Such functionality may be implemented in one or more modes and/or submodes. A transitional idle mode for targets undergoing dynamic modification of operating conditions offers reduced complexity and latency accompanied by reliable functionality and simplified verification and validation.

Figure 2:
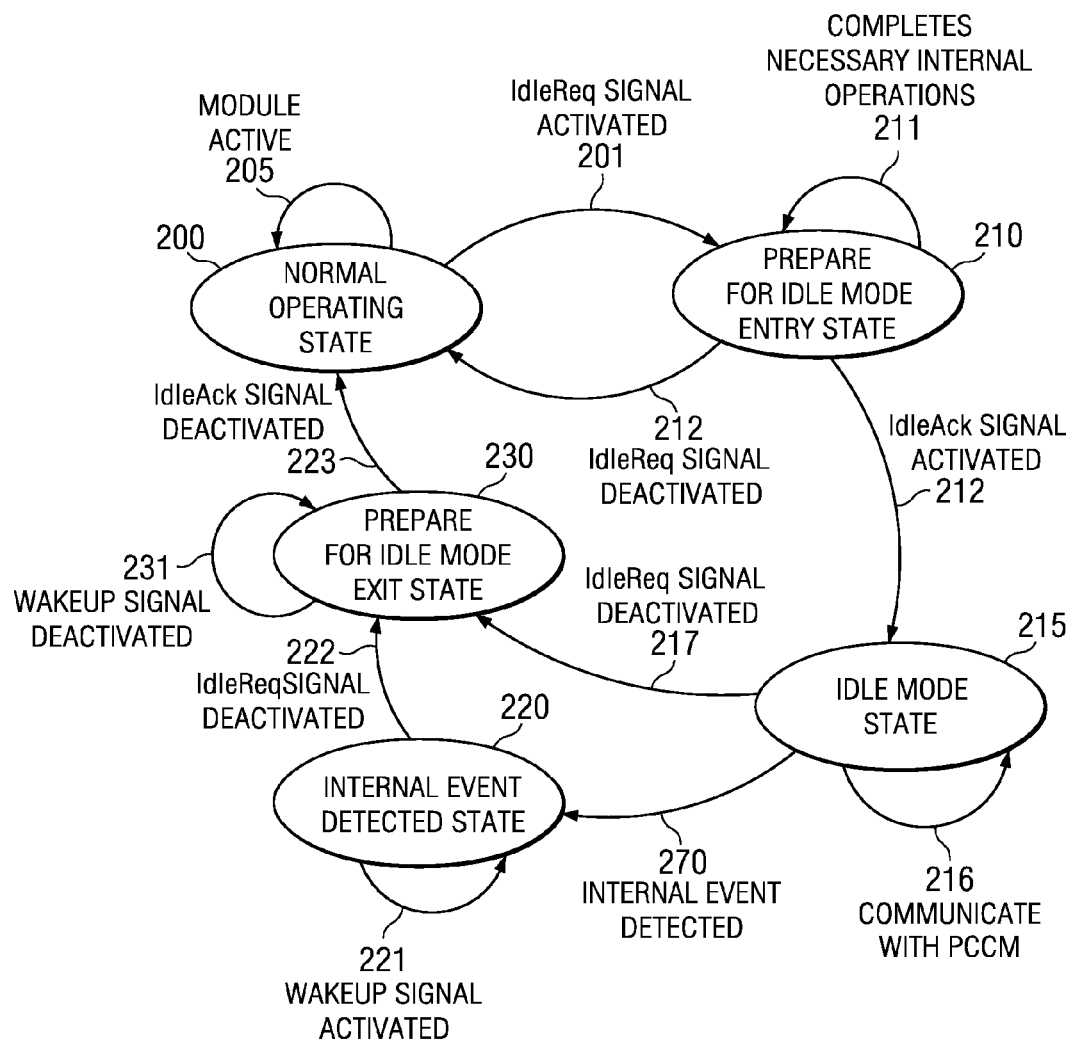
FIG. 2 shows a state diagram with the states for idle mode in accordance with some embodiments of the invention.

Turning now to FIG. 2, a state diagram for idle mode includes the following states: normal operating state 200, prepare for idle mode entry state 210, idle mode state 215, internal event detected state 220, and prepare for idle mode exit state 230. In normal operating state 200, target module 140 is active 205 and may receive and process write and read requests from initiator module 120 and perform internal operations. When PCCM 100 activates 201 the idlereq signal to target module 140, such as when initiator module 120 enters standby mode, target module 140 changes state into prepare for idle mode entry state 210.

In prepare for idle mode entry state 210, target module 140 completes internal operations 211 necessary to enter idle mode. For example, target module 140 may finish any internal processing necessary for completion before entry into idle mode, or target module 140 may prepare for low power or altered clock operation. If PCCM 100 deactivates 212 the idlereq signal, target module 140 transitions from prepare for idle mode entry state 210 to normal operating state 200. An embodiment of a memory controller in prepare for idle mode entry state 210 is discussed with reference to FIGS. 5 and 6.

Once target module 140 activates the idleack signal, target module 140 transitions from prepare for idle mode entry state 210 to idle mode state 215. In idle mode state 215, target module 140 communicates with PCCM 216, and may communicate with other modules depending on the embodiment, e.g., whether idle mode state 215 is transitional, whether the embodiment has submodes, etc. In some embodiments, target module 140 may not generate events to initiator module 120 in idle mode state 215. As described above, events may be interrupts, DMA requests, or other events synchronous to a commonly used clock signal in the device, such as a clock signal to interconnect module 150.

Further, PCCM 100 may modify or remove power and clock signal to target module 140. In some embodiments of the invention, power and the clock signal to target module 140 may remain unaltered while in other embodiments one or more operating conditions including power and clock may be altered to optimize a parameter, e.g., power consumption. In some embodiments, submodes, or additional states or modes, may be utilized to statically or dynamically modify performance of target module 140 following entry into idle mode state 215. Thus, in some embodiments target module 140 continues operating while in idle mode under normal or modified operating conditions, which may allow other modules in the system shown in FIG. 1 to enter power saving modes. An embodiment of a memory controller in idle mode state 215 is discussed with reference to FIGS. 5 and 6.

If PCCM 100 deactivates 217 the idlereq signal when target module 140 is in idle mode state 215, and if necessary returns power and clock, target module 140 transitions to prepare for idle mode exit state 230. Target module 140 may then deactivate the idleack signal 223 and enter normal operating state 200. In normal operating state 200, target module 140 is active and may communicate with other modules in the device and perform internal operations 205. An embodiment of a memory controller in idle mode exit state 230 is discussed with reference to FIGS. 5 and 6.

If an internal event in target module 140 is detected 270 during idle mode state 215, target module 140 transitions to internal event detected state 220. An internal event in target module 140, for example, may occur if target module 140 needs to communicate with initiator module 120. In internal event detected state 220, target module 140 activates 221 the wakeup signal to PCCM 100. When PCCM 100 deactivates 222 the idlereq signal when target module 140 is in internal event detected state 220, and if necessary returns power and clock, target module 140 transitions to prepare for idle mode exit state 230. Target module 140 then deactivates the wakeup signal 231, deactivates the idleack signal 223 and returns to normal operating state 200. In normal operating state 200, target module 140 is active 205 and may perform internal operations and communicate with other modules in the device by sending interrupt requests and DMA requests.

Figure 3:
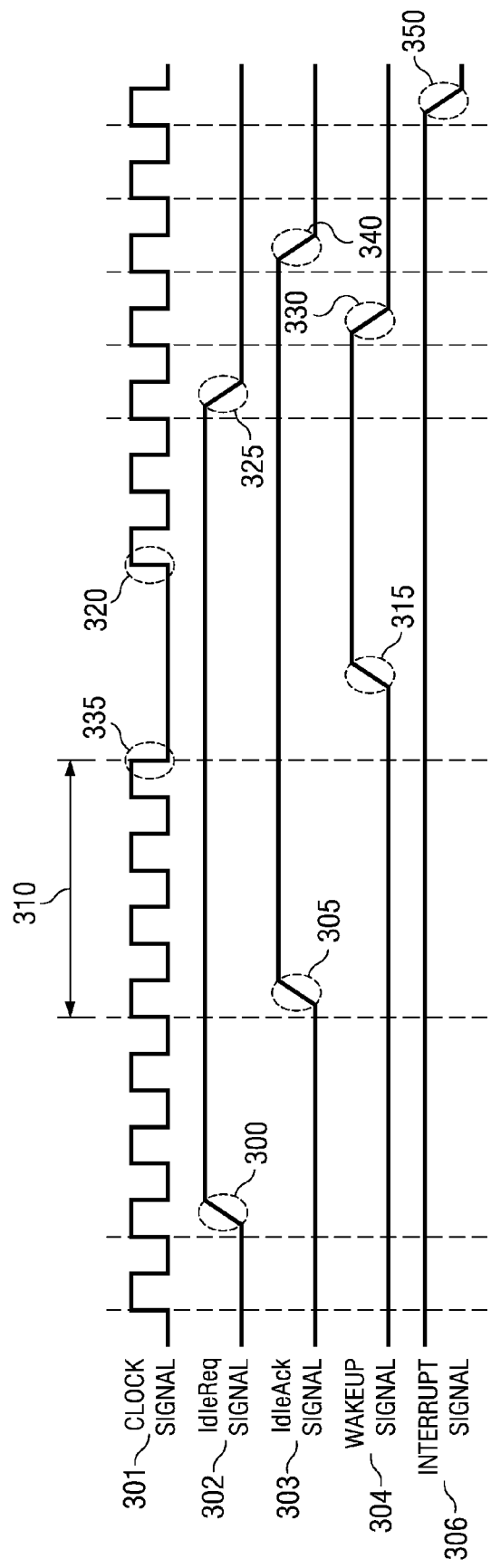
FIG. 3 shows a timing diagram of some signals associated with a target module for activating and deactivating a clock signal during idle mode in accordance with some embodiments of the invention.

Turning now to FIG. 3, a timing diagram of target module 140 shows one embodiment of the activation and deactivation of a system clock signal during idle mode. FIG. 3 shows the system clock signal 301 to the target module 140, idlereq signal 302, idleack signal 303, wakeup signal 304, and interrupt signal 306. As described above, clock signal 301 provides a synchronous timing signal to target module 140. PCCM 100 controls clock signal 301 through clock line 112 as shown in FIG. 1. Interrupt signal 306 shows timing for interrupts sent from target module 140 to initiator module 120.

In some embodiments of the invention, the signals shown in FIG. 3 may be activated by transitioning from low to high. Interrupt signal 306 may be activated by transitioning from high to low. In some other embodiments of the invention, the idlereq 302, idleack 303, and wakeup 304 signals shown in FIG. 3 may be activated by transitioning from high to low. Further, activation and deactivation of the signals shown in FIGS. 1 and 3 may be represented by a combination of several signals, one signal from a group of multiplexed signals, an encoded signal, or a sequence of burst signals.

In this embodiment, when PCCM 100 detects that initiator module 120 has entered standby mode or another power saving state and target module 140 interaction through interconnect module 130 is complete, PCCM 100 activates idlereq signal 300 to target module 140. Once target module 140 is capable of entering idle mode, target module 140 activates 305 idleack signal 303, thus allowing target module 140 to go into idle mode. In this embodiment, after idleack signal 303 is activated 305, interrupt signal 306 may not be activated until target module 140 exits idle mode. Thus, target module 140 may not transmit an interrupt to initiator module 120 while in idle mode. In accordance with the desired functionality that the clock to target module 140 be stopped upon entry into idle mode in this embodiment, after a delay 310 controlled by PCCM 100, PCCM 100 may remove 335 clock signal 301 to target module 140. Delay 310 may vary depending on, for example, the clock used by target module 140 and the modules connected to target module 140.

When target module 140 detects an internal event that necessitates target module 140 communication with initiator module 120, target module 140 activates 315 wakeup signal 304. In some embodiments of the invention, wakeup signal 304 is activated asynchronously 315 to clock signal 301 such as when clock signal 301 has been removed. Once target module 140 activates wakeup signal 304, PCCM 100 returns 320 system clock 301 and deactivates 325 idlereq signal 302.

Target module 140 may then deactivate (330, 340) wakeup signal 304 and idleack signal 303 and exit idle mode. Target module 140 may resume normal functionality and communicate with initiator module 120 and perform internal processing. For example, once target module 140 exits idle mode, target module 140 may transmit an interrupt signal 350 to initiator module 120.

Figure 4:
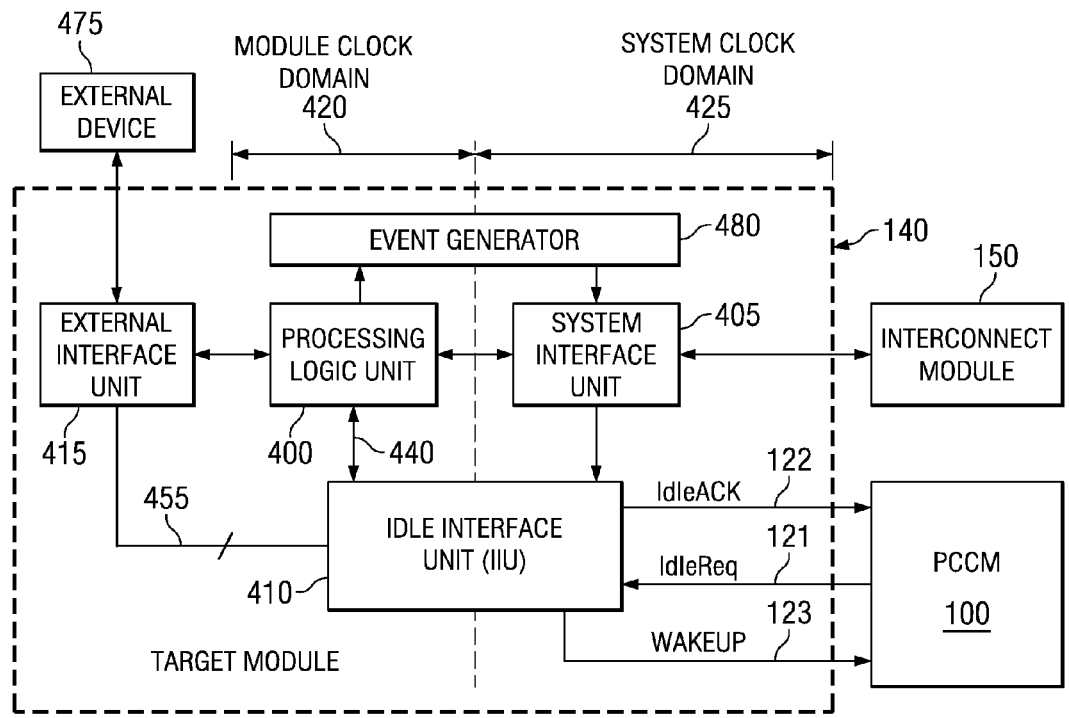
FIG. 4 is a schematic of a target module connected to an interconnect module and PCCM in accordance with some embodiments of the invention.

Turning now to FIG. 4, which shows an embodiment of a target module having multiple clock domains connected to an interconnect module and PCCM in accordance with some embodiments of the invention, target module 140 may include a processing logic unit 400 coupled to a system interface unit 405 and an idle interface unit (IIU) 410. System interface unit 405 may receive read and write requests from interconnect and initiator modules (not shown in FIG. 4). System interface unit 405 may further transmit interrupts to initiator and interconnect modules. Processing logic unit 400 represents the functional logic of target module 140. For example, if target module 140 is a memory device such as a memory controller, processing logic unit 400 may represent the storage and control components of the memory device. Processing logic unit 400 transmits information to system interface unit 405 to be sent to initiator module 120 (not shown in FIG. 4).

IIU 410 couples to PCCM 100 through signal lines idleack 122, idlereq 121, and wakeup 123. In some embodiments of the invention, IIU 410 determines if target module 140 should be placed into idle mode by evaluating the activity in target module 120 and idlereq line 121. If IIU 410 receives an idlereq signal from PCCM 100, IIU 410 may activate the idleack signal if target module 140 is prepared to enter idle mode. Thus, IIU 410 may place target module 140 into idle mode.

IIU 410 evaluates the activity within target module 140 and communication between target module 140 and other modules. In particular, processing logic unit 400, through connection 440, indicates to IIU 410 if internal processing is taking place. If IIU 410 receives the idlereq signal from PCCM 100 and detects that all predefined conditions for idle mode have been met, IIU 410 may activate the idleack signal and target module 140 may enter idle mode.

In some embodiments of target module 140, an external interface unit 415 connects to an external device 475. External interface unit 415 connects to processing logic unit 400. In some embodiments of the invention, target module 140 may be a peripheral module such as an interface device. The interface device may be capable of interfacing with an external device 475, such as a printer. In some embodiments of the invention, processing logic unit 400 may be capable of converting signals from an initiator module (not shown in FIG. 4) into information to be transmitted to, for example, a printer. When the printer is inactive, e.g., a print job has been sent to the printer and is stored in the printer memory and the printer no longer communicates with the initiator module, target module 140 may enter idle mode. If the printer experiences an error and needs to communicate the error through the interface device to the initiator module, external interface unit 415 activates a signal through connection 455 to IIU 410. If a signal is activated to IIU 410 through line 455 and the signals idleack 122 and idlereq 121 are active, the wakeup signal activates through wakeup line 123 to PCCM 100. Target module 140 then proceeds to exit idle mode as described above, assuming power and the clock signal are provided or restored to target module 140.

Processing logic unit 400 may also cause target module 140 to exit from idle mode. Processing logic unit 400, through internal logic, may determine that target module 140 needs to communicate with initiator module 120. For example, target module 140 may need to transmit an interrupt through interconnect module 150 to an initiator module (not shown). Processing logic unit 400 may activate a signal to IIU 410 through connection 440. IIU 410 detects that idleack line 122 and idlereq line 121 are active and may thus activate the wakeup signal through wakeup line 123 to PCCM 100. Target module 140 may then exit idle mode as described above and shown in FIG. 2, assuming power and the clock signal are provided or restored to target module 140.

In some embodiments of the invention, components of target module 140 may operate in separate clock domains. Separate clock domains may include multiple clock signals from different sources or one clock signal that is modified into multiple clock signals. System interface unit 405 may operate within system clock domain 425 in order to synchronously communicate with other modules of the device, such as interconnect module 150 and an initiator module (not shown in FIG. 4). Processing logic unit 400 may operate within module clock domain 420. Some components of target module 140, such as processing logic unit 400, for example, may not require as fast a clock speed as is needed for communicating with interconnect module 150 or the initiator module. By using a slower clock signal in module clock domain 420, power consumption in target module 140 may be reduced. Furthermore, a clock signal in module clock domain 420 may be a specific frequency for functional purposes. For example, if target module 140 is an audio interface module, processing logic unit 400 may require a clock signal with a specific frequency for processing audio information. Thus, the clock signal in module clock domain 420 may differ from a clock signal used in system clock domain 425 for communicating with interconnect module 150 and initiator module 120 (not shown in FIG. 4).

Using multiple clock domains in target module 140 enables a variety of power saving options for target module 140. For example, a clock signal used by components in system clock domain 425 may be turned off while a clock signal used by components in module clock domain 420 may be operating normally. Thus, in idle mode, processing logic unit 400 may process information when the clock signal is removed from system clock domain 425. In some other embodiments of the invention, target module 140 may contain more than two clock domains or simply a single domain.

In some embodiments of the invention, there may be one or more statically or dynamically programmable registers, e.g., configuration bit(s), to control performance of target module 140 in idle mode. In essence, such configuration bit(s) may be used to create submodes. In some embodiments, an idle register (not shown in FIG. 4) may dictate the control of module clock domain 420 and system clock domain 425. For example, the contents of the idle register may indicate to target module 140 that the clock signal to module clock domain 420 is to be removed in idle mode and the clock signal to the system clock domain 425 is to remain constant. Alternatively, the content of the idle register may indicate to target module 140 that the clock signal to module clock domain 420 is to remain constant in idle mode and the clock signal to the system clock domain 425 is to be removed, and so on. Both the clock signals to the module clock domain and the system clock domain may be removed or remain constant.

In some embodiments of the invention, the content of the idle register may be altered by a processor (not shown in FIG. 4) or other module in a system according to conditions in the system. The content of the idle register, or registers, may also control power to module clock domain 420 and system clock domain 425. For example, IIU 410 may vary conditions to enter idle mode based on the content of the idle register. In some embodiments, a component in target module 140, PCCM 100 or other module may change the configuration bit(s) stored in register(s).

Communication between components in different clock domains may need interfacing circuitry. In a system containing two separate clock domains, for example, components in each clock domain may communicate at different rates. When these components in different clock domains need to communicate with each other, interfacing circuitry may be necessary to ensure that no information is lost during communication between the components in different clock domains. For example, a component in a low speed clock domain may not be able to read information from a component in a high speed clock domain.

IIU 410 and an event generator 480 are capable of operating in both module clock domain 420 and system clock domain 425. These modules ensure error free flow of information from module clock domain 420 to system clock domain 425 and vice versa. Event generator 480 couples to processing logic module 400 and system interface module 405.

As described above, when target module 140 is in idle mode and an internal operation occurs in processing logic unit 400 that necessitates target module 140 communicating with an initiator module, target module 140 may exit idle mode. For example, processing logic unit 400 may need to send an event, such as an interrupt or DMA request, to the initiator module (not shown in FIG. 4). However, an event generated by processing logic unit 400 may not be in the same clock domain as the system interface unit 405 that sends events from target module 140 to the initiator module.

To ensure that the event is generated and the clock domain communication issue described above is avoided, the event may be generated by event generator 480. Event generator 480 is capable of communicating between module clock domain 420 and system clock domain 425. Event generator 480 sends the event to the initiator module (not shown in FIG. 4) through system interface unit 405 and interconnect module 150. Without event generator 480 placed between processing logic unit 400 and system interface unit 405, interrupts and other interactions generated by processing logic unit 400 may not be communicated between the different clock domains.

Figure 5:
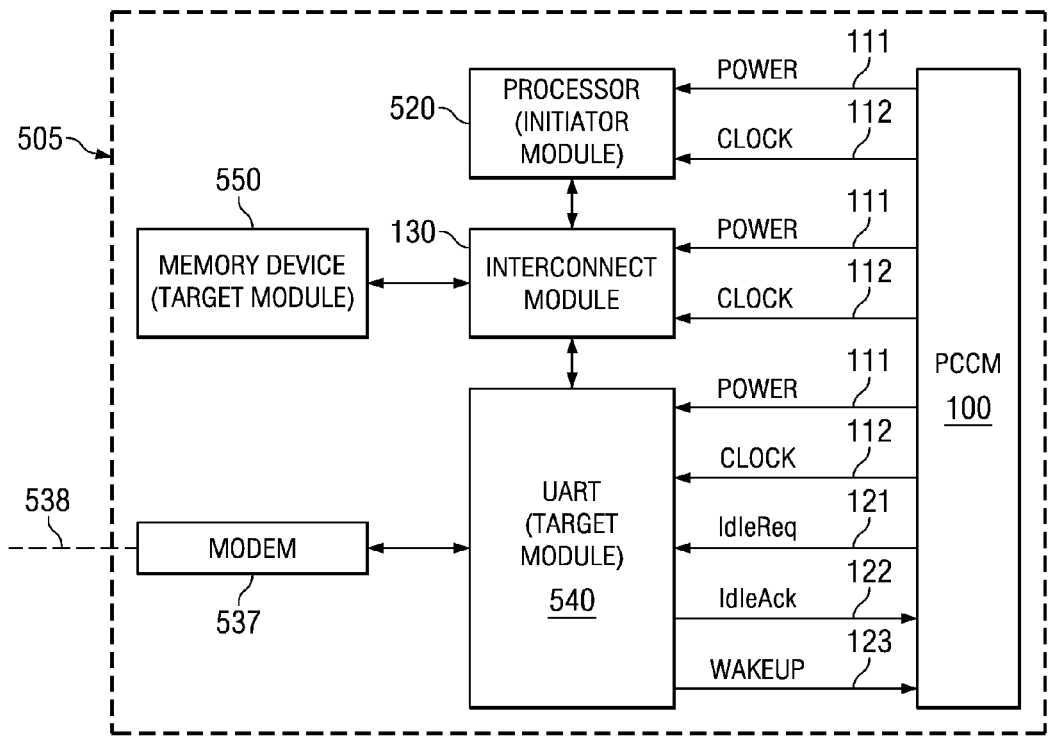
FIG. 5, in accordance with some embodiments of the invention, shows a plurality of target modules in the system of FIG. 1.

Turning now to FIG. 5, an interconnect module 130 couples to a universal asynchronous receiver/transmitter (UART) 540, processor 520, memory device 550, and PCCM 100. A power line 111 and a clock line 112 are coupled from PCCM 100 to each module shown in FIG. 5. UART 540 couples to PCCM 100 through an idlereq line 121, idleack line 122, and wakeup line 123. Additional idlereq, idleack, and wakeup lines (not shown) couple from PCCM 100 to memory device 550. The power and clock lines connected to memory device 550 are also not shown in FIG. 5. Memory device 550 and UART 540 are both target modules capable of entering idle mode, and processor 520 is an initiator module capable of entering standby mode.

In some embodiments, there are a plurality of initiator modules and a plurality of target modules. In some embodiments, each target module may respond differently to idle mode, e.g., in accordance with configuration bits stored in each target module.

UART 540 is capable of interfacing with a peripheral device such as a modem, printer, mouse, GPS receiver, Bluetooth receiver/transmitter, personal digital assistant (PDA), digital camera, or other serial device. In FIG. 5, UART 540 couples to modem 537. Modem 537 is a device capable of receiving serial data transmitted from UART 540 and communicating the serial data over a telephone line or other communication medium 538 to another modem (not shown).

Processor 520 transfers words of information from memory device 550 to UART 540 for transmission to modem 537. UART 540 transmits each word of information serially, meaning one bit at a time, to modem 537. Conversely, the UART is also capable of receiving information serially and converting the bits into words of information. Modem 537 may possess the same serial conversion capability as UART 540, thus allowing serial communication between UART 540 and modem 537.

In some embodiments of the invention, UART 540 includes a buffer to hold information, such as data or instructions, to be transmitted or converted. The buffer is a memory device which may hold, for example, 16 kilobytes (Kb) of information, 32 Kb of information, or 64 Kb or greater of information. As the UART 540 transmits information to modem 537, processor 520 fills the UART's buffer with information from memory device 550. In some embodiments of the invention, once UART 540 serially transmits the information stored in the buffer, processor 520 may refill the buffer with more information to be transmitted.

In some embodiments of the device shown in FIG. 5, when processor 520 is not communicating with UART 540 or memory device 550, processor 520 may enter standby mode. When processor 520 enters standby mode, PCCM 100 may activate an idlereq signal to UART 540 and memory device 550. In some embodiments, UART 540 would stop communicating with modules in system 505 other than PCCM 100 and modem 537. Thus, UART 540 would activate an idleack signal to PCCM 100 through idleack line 122 and enter idle mode. In idle mode, PCCM 100 may remove power and the clock signal to the UART's system clock domain 425 (not shown in FIG. 5 but shown in FIG. 4) and maintain the power signal and clock signal sent to module clock domain 420 (shown in FIG. 4) so that modem 537 may transfer information and UART 540 may empty or fill its buffer.

In some embodiments of idle mode, UART 540 may serially transmit information stored in the UART buffer to modem 537 for transmission across connection medium 538. Power is conserved in UART 540 because power and the clock signal are removed from system clock domain 425. Further, power and the clock signal sent to interconnect module 130 and processor 520 may be removed because no information is transferring between processor 520, memory device 550, and UART 540. In some embodiments of the invention, memory device 550 may also enter idle mode.

When UART 540 transfers all the information in the buffer or the buffer needs to be filled, UART 540 may need to send an interrupt to processor 520 indicating that more information is needed. While in idle mode, UART 540 may not communicate with modules other than PCCM 100 or modem 537, thus UART 540 needs to exit idle mode to send the interrupt. When UART 540 detects that the information buffer is empty or full, UART 540 activates the wakeup signal to PCCM 100 through wakeup line 123. PCCM 100 returns power and the clock signal for UART 540 to steady state levels.

In particular, power and the clock signal to system clock domain 425 of UART 540 are returned to steady state levels. PCCM 100 deactivates the idlereq signal. UART 540 then deactivates the wakeup signal and the idleack signal and enters normal operating mode. PCCM 100 may return power and the clock signal to interconnect module 130 to steady state levels when PCCM 100 detects that UART 540 has to exit idle mode.

UART 540 may then send an interrupt to processor 520 indicating that more information is needed to fill the UART buffer. In particular, processing logic unit 400 (see FIG. 4) in UART 540 may indicate to event generator 480 to generate an interrupt synchronous with the system clock to be sent through interconnect module 130 to processor 520. When the interrupt is received by processor 520 through interconnect module 130, processor 520 may exit standby mode. Once processor 520 exits standby mode, memory device 550 may exit idle mode. Processor 520 may now read information from memory device 550 and write the information into the UART buffer. When the UART 536 buffer is full and processor 520 no longer needs to initiate any more read or write requests, processor 520 may enter standby mode. Memory device 550 and UART 540 may enter idle mode, and power and the clock signal may be removed from interconnect module 130.

In some embodiments of FIG. 5, information may transfer directly from memory device 550 to the UART buffer by using a direct memory access (DMA) controller (not shown in FIG. 5). A DMA controller moves information from memory device 550 to UART 540 without constantly involving processor 520. Thus, processor 520 may enter or remain in standby mode while information transfers directly from memory device 550 to UART 540, further reducing power consumption in the electronic device.

As shown in FIG. 5, idle mode may be used in a device with multiple initiator modules and target modules. Idle mode may enable portable electronic devices comprising multiple initiator and target modules to reduce power consumption while allowing error free operation. Furthermore, the operation of idle mode as described above may be tested and verified at a module level instead of at the device level, thus reducing the time and complexity to test the electronic device. In some embodiments of the invention, PCCM 100 may control multiple clock signals to an individual module. For example, the PCCM may transmit two clock signals through two clock lines to the processor.

In some embodiments of the invention, a target module may also contain a forced idle mode. Forced idle mode may be used as an alternative for idle mode. If idle mode in target module 140 of the system shown in FIG. 1 is not functioning properly, target module 140 may be placed into forced idle mode instead of idle mode. In forced idle mode, the target module enters idle mode upon PCCM 100 activating the idlereq signal. The target module activates the idleack signal when the idlereq signal is received and enters idle mode. The target module 140 exits forced idle mode when the idlereq signal is deactivated. Thus, PCCM 100 controls forced idle mode in target module 140 through the idlereq signal. Forced idle mode may allow power management in initiator module 120, interconnect module 130, and target module 140 if idle mode is not functioning properly at test time.

In some embodiments of the invention, target module 140 may also contain a configuration bit for no-idle mode. In no-idle mode, the target module may not enter idle mode. Thus, if a target module is in no-idle mode, the target module may receive an idlereq signal but may neither activate the idleack signal nor enter idle mode. No-idle mode may be used in target modules that cannot or should not enter idle mode.

In some embodiments of the invention, each target module 140 in the electronic device may have one or more control registers associated with it. Each control register may contain a code indicating the particular idle mode, or submode, for the target module for determining the response to a request to enter idle mode. For example, the control register in the electronic device may be programmed so that the target module functions in idle mode. Alternatively, the control register may be programmed so that the target module functions in forced idle mode or no-idle mode. In some embodiments, a configuration bit stored in a register may dictate a submode. In some embodiments, a configuration bit, or bits, stored in a register, or registers, may dictate whether idle mode will be a transitional state during dynamic modification of operating conditions, a shutdown state in which target module 140 will dwell, or a state in which target module 140 will dwell during normal or modified operation. In some embodiments, the status of the one or more registers may in turn dictate other selectable functionality within target module 140. In some embodiments of the invention, a processor or other module coupled to the target module 140 may change the idle mode of target module 140 by modifying the contents of the control register.

Figure 6A:
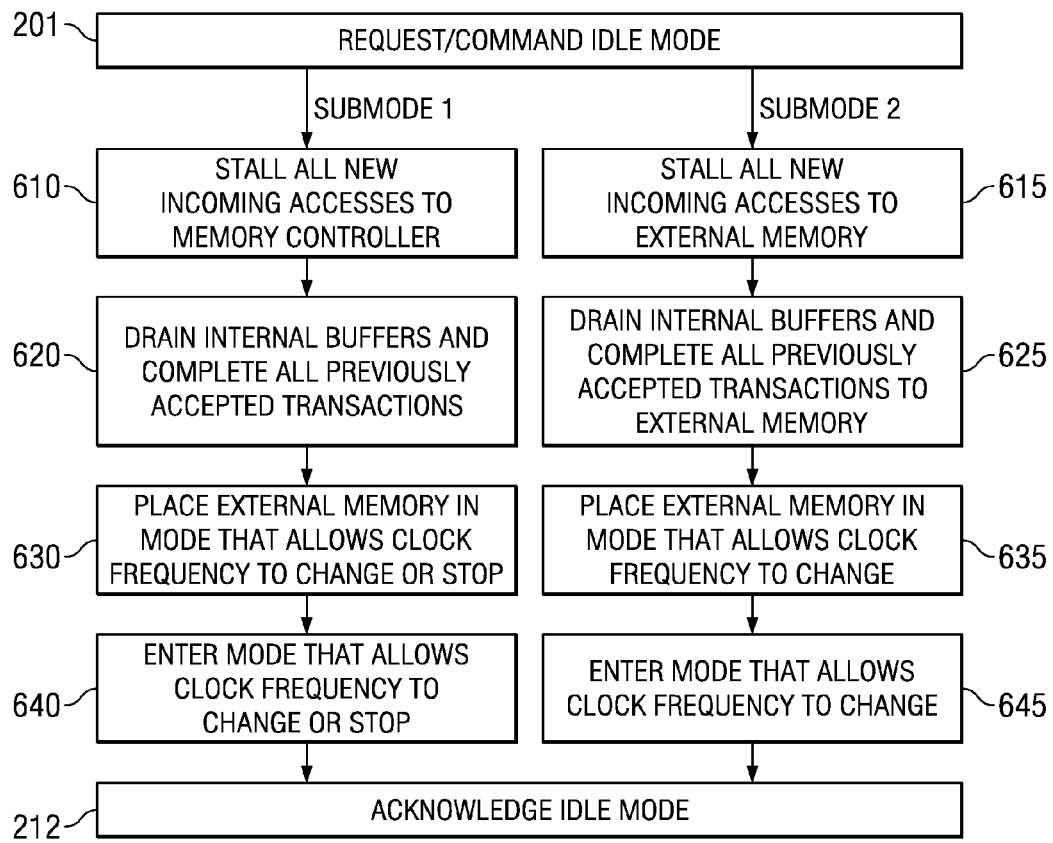
FIG. 6a, in accordance with some embodiments of the invention, shows the operation of a memory controller preparing to enter idle mode.
Figure 6B:
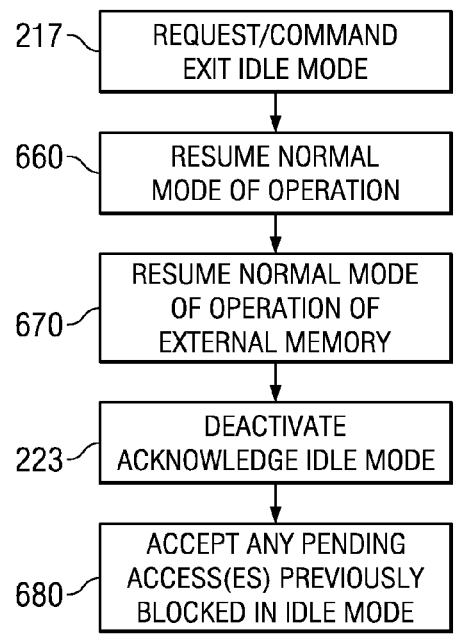
FIG. 6b, in accordance with some embodiments of the invention, shows the operation of a memory controller preparing to exit idle mode.

Turning now to FIGS. 6a-b, an embodiment of a memory device, e.g., a memory controller, will be described with further reference to FIGS. 2 and 5. A memory controller serves to control access to memory, e.g., system memory (not shown). In this embodiment, memory device 550 (as shown in FIG. 5) comprises a memory controller, which is coupled to system memory via a memory bus (not shown). FIG. 6a illustrates an embodiment of a memory controller in prepare for idle mode entry state 210 (as shown in FIG. 2). FIG. 6a illustrates two modes, or submodes, of operation. As previously discussed, such submodes may be selected, for example, by one or more configuration bits in memory controller 550. In this embodiment, in submode 1 the clock can be stopped or its frequency may be modified. In submode 2 the clock can be modified, but not stopped.

Upon entry into idle mode entry state 210, in submode 1, memory controller 550 stalls all new incoming accesses to the memory controller 610. In submode 2, memory controller stalls all new incoming accesses to the external memory 615, but continues to allow access to the internal registers of memory controller 550. In either submode, the stalled new transactions, e.g., read/write access requests, are not lost. They are blocked in interconnect module 130 or at initiator 520.

Submode 1 drains internal buffers and completes all previously accepted transactions 620 prior to entering idle mode entry state 210. Submode 2 drains internal buffers and completing all previously accepted transactions to external memory 625 (not shown) controlled by memory controller 550.

Submode 1 places external memory in a mode where its clock can be stopped or its frequency changed 630. Submode 2 places external memory in a mode where its clock frequency can be changed 635. In some embodiments, these steps, 630, 635, to prepare memory controller 550 and memory (not shown) for entry into idle mode state 215 should not require any operations from the memory controller 550 but must ensure retention of the contents of the memory. This may depend on the type of memory. For example, DDR memory should be placed into a self-refresh state or power down mode.

Submode 1 causes memory controller 550 to enter a mode where its clock can be stopped or its frequency can be changed 640. Submode 2 causes memory controller 550 to enter a mode where its clock frequency can be changed 645. Steps 640, 645 depend on the type and implementation of memory controller 550. If memory controller 550 is a DDR memory controller, it may have a DLL component. Thus, a DDR memory controller should be placed in a state that unlocks the DLL and prevents it from attempting to relock on the clock as it is stopped or otherwise modified.

Following preparations to enter idle mode, i.e. 610-640 and 615-645, respectively, submode 1 and submode 2 activate 212 idleack signal 122. As previously discussed, communications pertaining to idle mode entry and exit may be implemented in a variety of ways, including, but not limited to, dedicated hardware signals, bus protocol commands, configuration bits, or a combination thereof.

In some embodiments of the invention, after memory controller 550 has acknowledged entry into idle mode state 215 (as shown in FIG. 2), the processor (not shown) can change the clock frequency or shut down the clock according to the submode of operation. If the clock frequency is to be changed, the processor may set a new timing parameter corresponding to a new clock frequency. The new timing parameter may be loaded immediately or could be loaded upon exiting idle mode, depending on the particular implementation, e.g., whether idle mode is a transitional state or an operational state. An operational state may comprise continued operation at normal operating conditions, at modified operating conditions, or a cessation of operation. An operational idle mode state having continued operation may be distinct from a transitional idle state to dynamically modified operation because functionality may be different in idle mode state relative to normal mode state even though the operating conditions may be the same.

FIG. 6b illustrates an embodiment of a memory controller in prepare for idle mode exit state 230 after idlereq signal 121 is deactivated 217. Idlereq signal 121 is deactivated 217, for example, when a clock frequency that has been modified has settled. Upon entering prepare for idle mode exit state 230, memory controller 550 resumes a normal mode of operation 660. This may depend on the type of memory. For example, in the case of DDR memory, memory controller 550 would place the DLL in a state where it will attempt to relock on the frequency of the clock. The original or a new clock frequency may be loaded or re-loaded, respectively, at this time depending on the particular implementation.

Memory controller 550 resumes a normal mode of operation of external memory (not shown) 670. This depends on the variety of memory. For DDR memory, memory controller 550 causes the DDR memory to exit self-refresh mode or power down mode. When the preparations are complete, memory controller 550 deactivates 223 idleack signal 122 and proceeds to normal operating state 200. Memory controller 550 then accepts 670 any pending accesses that were previously blocked while in idle mode 680. This may depend on the type of memory. For DDR memory, memory controller 550 may accept pending accesses as soon as its DLL component re-locks on the modified frequency 680.

The foregoing embodiment allows the operating conditions, e.g., clock frequency, of the memory controller and external memory to dynamically change with minimal software overhead, minimal latency and reduced complexity. Access to the memory controller is reliably stalled and pending accesses are taken up after modification of the operating conditions. This allows a system to use the idle state more frequently for optimization. Similar embodiments allow the memory controller and memory to dwell in idle state, operating under normal conditions, modified conditions, shutdown partially or shutdown completely. Dynamically variable functionality, e.g., configuration bits stored in registers, provides greater opportunity to optimize the performance of target modules. This is very suitable for complex systems such as SOCs installed in portable electronic devices.

The inventions described herein provide numerous benefits. For example and not by way of limitation, by the inventions described herein, software development is simplified, software overhead and, therefore, latency, is reduced, transitions in operating conditions can be more dynamic resulting in increased optimization of one or more parameters, implementation and validation are simplified, costs are reduced, and the inventions can be integrated into larger system optimization strategies.

While the present invention has been described with respect to a limited number of embodiments, those skilled in the art will appreciate numerous modifications and variations there from. It is intended that the appended claims cover all such modifications and variations as fall within the true spirit and scope of this present invention.

What is claimed is:

1. A method for operating a system, the method comprising:
   receiving a plurality of memory access requests initiated by at least one initiator module for access to a memory device coupled to the at least one initiator module, wherein the memory device comprises a memory controller coupled to system memory;
   receiving a request from a power control module to allow an operating condition of the system memory to be modified;
   preparing the memory controller and the system memory it controls for modification of the operating condition by blocking a later portion of the plurality of memory access requests and completing a earlier portion of the plurality of memory access requests;
   sending an acknowledgment to the power control module after the earlier portion of memory requests is completed indicating that the operating condition of the memory controller may be modified;
   receiving the modification in operating condition from the power control module only in response to sending the acknowledgement;
   reinstating access to the memory controller and to the memory it controls for operation under the modified operating condition by unblocking the later portion of the plurality of memory access requests and performing the requested accesses to the system memory under the modified operating condition; and
   such that the at least one initiator module continues to initiate requests for access to the system memory without interruption.

2. The method of claim 1, wherein the operating condition comprises clock frequency.

3. The method of claim 2, wherein the memory comprises Double Data Rate (DDR) Dynamic Random Access Memory (DRAM), the memory controller comprises a delay locked loop (DLL) component and preparing the memory and memory controller for modification comprises unlocking the DLL component and preventing it from relocking.

4. The method of claim 1, wherein preparing the memory and memory controller for modification is performed by changing one or more configuration bits stored in the memory controller.

5. The method of claim 4, wherein the one or more configuration bits establish multiple modes of operation of the memory controller in response to an indication that an operating condition of the memory controller and memory may be modified.

6. The method of claim 5, wherein the one or more configuration bits establish at least two modes of operation, wherein denying access to the memory controller while the operating condition is being modified comprises, in a first mode, denying all access to the memory and memory controller and, in a second mode, denying access only to the memory while permitting access to registers in the memory controller.

7. The method of claim 1, wherein indicating that the operating condition of the memory controller may be modified comprises activating a dedicated hardware signal to the memory controller.

8. The method of claim 1, wherein indicating that an operating condition of the memory controller may be modified comprises a bus protocol command to the memory controller.

9. The method of claim 1, further comprising placing the memory controller in an unmodifiable mode, wherein while in the unmodifiable mode, an acknowledgement to a request to allow modifying of the operating condition will not be sent, such that a modification in operating condition will not be received.

10. An electronic device, comprising:
    an initiator module coupled to a system memory, wherein the system memory is controlled by a memory controller having a request buffer;
    a power control module coupled to the memory controller, wherein the power control module is capable of varying an operating condition of the system memory; and
    wherein the memory controller is configured to:
       receive a plurality of memory access requests into the request buffer initiated by the initiator module for access to the system memory;
       receive a request from the power control module to allow an operating condition of the system memory to be modified;
       prepare the system memory for modification of the operating condition by blocking a later portion of the plurality of memory access requests in the request buffer and completing a earlier portion of the plurality of memory access requests;
       send an acknowledgment to the power control module after the earlier portion of memory requests is completed indicating that the operating condition of the memory controller may be modified;
       receive the modification in operating condition from the power control module only in response to sending the acknowledgement;
       reinstate access to the system memory by unblocking the later portion of the plurality of memory access requests and performing the requested accesses to the system memory under the modified operating condition; and
       such that the initiator module continues to initiate requests for access to the memory device without interruption.

11. The electronic device of claim 10, wherein the operating condition comprises clock frequency, wherein the power control module is configured to change a frequency of a clock signal used by the system memory after receiving an acknowledge on the acknowledge signal.

12. The electronic device of claim 10, wherein system memory is Double Data Rate (DDR) Dynamic Random Access Memory (DRAM).

13. The electronic device of claim 10, wherein the memory controller comprises one or more configuration bits.

14. The electronic device of claim 10, wherein the memory controller and the power control module are coupled by dedicated hardware signal lines.

15. The device of claim 10, wherein the is further configured to be placed in an unmodifiable mode, wherein while in the unmodifiable mode, an acknowledgement to the request to allow a change to the operating condition will not be provided by the memory controller, such that the power control module will not vary an operating condition of the system memory while the memory controller is in the unmodifiable mode.

* * * * *